United States Patent
Wang et al.

(10) Patent No.: US 9,961,676 B2
(45) Date of Patent: May 1, 2018

(54) METHOD AND APPARATUS FOR RESOURCE MAPPING OF A PHYSICAL DOWNLINK CONTROL CHANNEL

(71) Applicant: FUJITSU LIMITED, Kawasaki-shi, Kanagawa (JP)

(72) Inventors: Yi Wang, Beijing (CN); Hua Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 14/303,209

(22) Filed: Jun. 12, 2014

(65) Prior Publication Data
US 2014/0293922 A1 Oct. 2, 2014

Related U.S. Application Data

(63) Continuation of application No. PCT/CN2011/084522, filed on Dec. 23, 2011.

(51) Int. Cl.
*H04W 72/04* (2009.01)
*H04L 5/00* (2006.01)

(52) U.S. Cl.
CPC ......... *H04W 72/042* (2013.01); *H04L 5/0053* (2013.01); *H04L 5/0058* (2013.01); *H04L 5/0007* (2013.01)

(58) Field of Classification Search
CPC ............. H04W 76/007; H04W 72/042; H04W 52/026; H04L 5/0058; H04L 5/0053; H04L 5/0048
See application file for complete search history.

(56) References Cited

U.S. PATENT DOCUMENTS

2011/0044391 A1* 2/2011 Ji .................. H04L 5/0007
375/260
2011/0268062 A1* 11/2011 Ji .................. H04L 5/0055
370/329

(Continued)

FOREIGN PATENT DOCUMENTS

CN 101500260 A 8/2009
CN 102014491 A 4/2011
(Continued)

OTHER PUBLICATIONS

International search report issued for corresponding international application No. PCT/CN2011/084522, dated Oct. 4, 2012.

(Continued)

*Primary Examiner* — Jackie Zuniga Abad
(74) *Attorney, Agent, or Firm* — Myers Wolin, LLC (57) ABSTRACT

A method for resource mapping of a physical downlink control channel (PDCCH), including: determining the number of resource sub-blocks to which a predefined number of enhanced control channel elements (eCCEs) correspond, according to the size of a resource sub-block in one resource block (RB); determining the number of RBs onto which the predefined number of eCCEs are needed to be mapped, according to the number of resource sub-blocks to which the predefined number of eCCEs correspond; and mapping eCCEs within the PDCCH to RBs according to the number of RBs onto which the predefined number of eCCEs are needed to be mapped; wherein locations of resource sub-blocks to which the eCCEs or the predefined number of eCCEs within the PDCCH correspond are different in each of the RBs.

4 Claims, 6 Drawing Sheets (56) References Cited

U.S. PATENT DOCUMENTS

| | | | |
|---|---|---|---|
| 2011/0299490 A1 | 12/2011 | Nordstrom et al. | |
| 2013/0223402 A1* | 8/2013 | Feng .................... | H04L 5/0007 370/330 |
| 2014/0314036 A1 | 10/2014 | Takeda et al. | |

FOREIGN PATENT DOCUMENTS

| | | |
|---|---|---|
| JP | 2013-123204 A | 6/2013 |
| JP | 2015-501620 A | 1/2015 |
| RU | 2 254 611 C2 | 1/2005 |
| WO | 2007/051181 A1 | 5/2007 |
| WO | 2009/088202 A2 | 7/2009 |
| WO | 2011/136523 A2 | 11/2011 |
| WO | 2011159132 A2 | 12/2011 |
| WO | 2013/067823 A1 | 5/2013 |

OTHER PUBLICATIONS

Extended European search report with supplementary European search report and the European search opinion issued by the European Patent Office for corresponding European Patent Application No. 11877994.1, dated Aug. 6, 2015.
Samsung, "Discussion on ePDCCH Design Issues", Agenda Item: 6.6.2.2, 3GPP TSG-RAN1 Meeting #66, R1-112517, Athens, Greece, Aug. 12-26, 2011.
NEC Group, "DL Distributed Resource Block Mapping for inter-cell interference randomization", Agenda Item: 5.12, 3GPP TSG RAN WG1 Meeting #49bis, R1-072827, Orlando, USA, Jun. 25-29, 2007.
Samsung, "Performance evaluation of enhanced control channel based on UE-specific reference signaling", Agenda item: 7.7.1, 3GPP TSG RAN WG1 Meeting #67, R1-114240, San Francisco, USA, Nov. 14-18, 2011.
Office Action issued by the Japan Patent Office for corresponding Japanese Patent Application No. 2014-547662, dated Aug. 18, 2015, with an English translation.
Final Office Action issued by the Japan Patent Office for corresponding Japanese Patent Application No. 2014-547662, dated Feb. 9, 2016, with an English translation.
Notice of Preliminary Rejection issued by the Korean Intellectual Property Office for corresponding Korean Patent No. 10-2014-7018647, dated Jan. 25, 2016, with English translation.
Official Action issued by Rospatent Federal Service for Intellectual Property for corresponding Russian Patent Application No. 2014130240/07(048695), dated Oct. 13, 2015, with an English translation.
Office Action issued by the Canadian Intellectual Property Office for corresponding Canadian Patent Application No. 2,859,692, dated Oct. 14, 2015.
Office Action issued by the Canadian Intellectual Property Office for corresponding Canadian Patent Application No. 2,859,692, dated Sep. 12, 2016.
Notice of Final Rejection issued by the Korean Intellectual Property Office for corresponding Korean Patent Application No. 10-2014-7018647, dated Jul. 29, 2016, with English translation.
Office Action and Search Report issued by Rospatent Federal Service for Intellectual Property for corresponding Russian Patent Application No. 2016122039/07(034489) dated Mar. 27, 2017, with an English translation.
First Office Action and search report issued for corresponding Chinese Patent Application No. 201180075043.0, dated Jan. 3, 2017, with an English translation.
First Office Action issued by the Japan Patent Office for corresponding Japanese Patent Application No. 2016-093626, dated Mar. 28, 2017, with an English translation.
Notice of Preliminary Rejection issued for corresponding Korean Patent Application No. 10-2017-7004867 dated April 6, 2017, with an English translation.
Second Office Action issued for corresponding Chinese Patent Application No. 201180075043.0 dated Sep. 4, 2017, with an English translation.
Office Action and Search Report issued by the Canadian Intellectual Property Office for corresponding Canadian Patent Application No. 2,859,692, dated Jun. 20, 2017.

* cited by examiner

METHOD AND APPARATUS FOR RESOURCE MAPPING OF A PHYSICAL DOWNLINK CONTROL CHANNEL

CROSS-REFERENCE TO RELATED APPLICATIONS

This is a continuation of International Application No. PCT/CN2011/084522, filed on Dec. 23, 2011, now pending, the contents of which are herein wholly incorporated by reference.

TECHNICAL FIELD

The present invention relates to wireless communication technologies, and in particular to a method and apparatus for resource mapping of a physical downlink control channel in an LTE (long-term evolution)/LTE-A (LTE-advanced) system.

BACKGROUND ART

Figure 1:
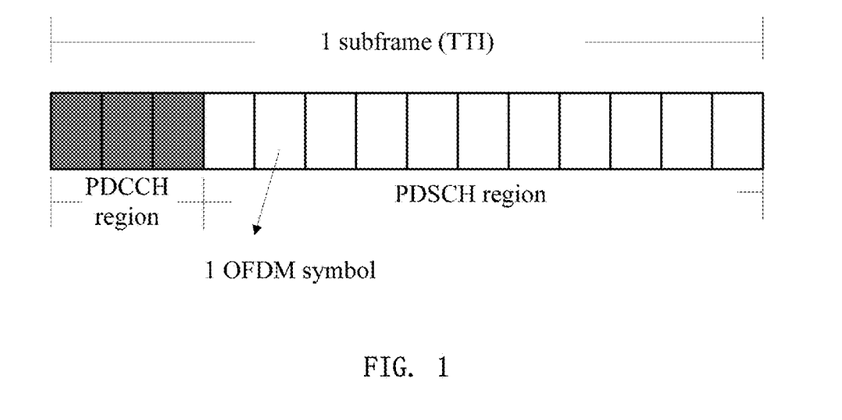
FIG. 1 is a schematic diagram of transmission regions of PDCCH and PDSCH in an LTE system.

In an LTE system, various downlink control information (DCI) is transmitted in a form of physical downlink control channel (PDCCH) by a base station, and data is transmitted in a form of physical downlink shared channel (PDSCH) by the base station. PDCCH and PDSCH are present in a time-division form in each subframe. As shown in FIG. 1, a first to an N-th OFDM (Orthogonal Frequency Division Multiplexing) symbols are possible transmission region of PDCCH, N=1, 2, 3 or 4, which is configured through a higher layer, and OFDM symbols starting from an (N+1)-th OFDM are transmission region of PDSCH. PDCCH supports spatial diversity multi-antenna transmission based on a cell-specific reference signal (CRS), with a maximum number of transmission antennas being 4. A region of PDCCH is further divided into a common search space and a UE-specific search space. Common search spaces of all user equipment (UE) are identical, and all UE searches PDCCH of its own in identical spaces. And the UE-specific search space is related to a radio network temporary identifier (RNTI) of the UE, in which the UE searches PDCCH of its own only. In searching PDCCH by UE, it is assumed that there are four possible aggregation levels, L=1, 2, 4, 8, and each aggregation level has multiple possible locations, referred to as multiple candidates. Location of each candidate may be calculated according to a predefined rule. As shown in Table 1, aggregation level of PDCCH corresponds to control channel element (CCE) one by one, a minimum aggregation level L=1 corresponding to one CCE, and one CCE corresponding to 36 resource elements (REs).

| Search space $S_k^{(L)}$ | | | Number of PDCCH candidates $M^{(L)}$ |
|---|---|---|---|
| Type | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Figure 2:
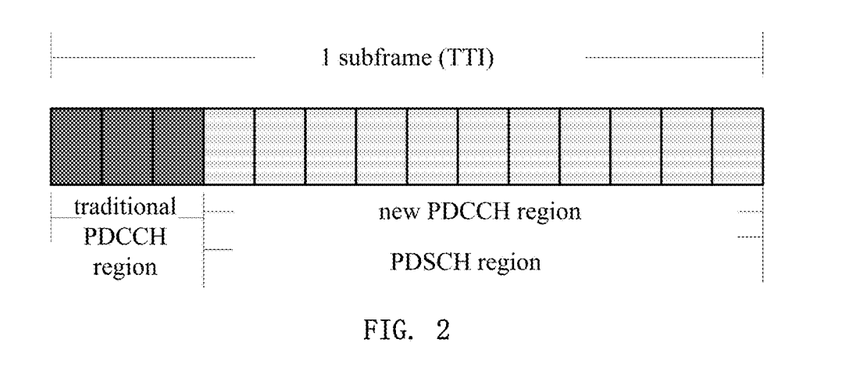
FIG. 2 is a schematic diagram of new transmission regions of PDCCH and PDSCH.

In order to increase data transmission rate and to improve spectrum efficiency, multi-antenna has been widely used in wireless communication systems. In an LTE-advanced system, a downlink may support up to 8 transmission antennas, so as to reach a transmission rate of 1 Gbps. PDSCH may not only increase data transmission rate but also expand the coverage of a signal by precoding and beamforming. And PDCCH cannot support 8 antennas for transmission, and can only support a transmission diversity of up to 4 antennas, hence, it cannot obtain a beamforming gain identical to that of PDSCH. In order to further improve performance of cell-edge UE, a coordinated multipoint transmission technology based on a network architecture of multiple geographically separated remote radio heads (RRHs) shall be widely used in future wireless communication systems. In a network architecture of multiple RRHs, a cell split gain is obtained by simultaneously scheduling PDSCH of UE within a coverage of each RRH, so as to improve the cell capacity. And at the same time, the cell capacity may also be improved in a manner of space multiplexing of PDSCHs of multiple UE. As an existing CRS-based PDCCH cannot obtain a cell split gain, people start to pay attention to the study of a PDCCH based on a DM-RS (demodulation reference symbol), that is, the PDCCH is expanded from conventional former N OFDM symbols to a PDSCH region starting from an (N+1)-th OFDM symbol, as shown in FIG. 2. UE may obtain a location of a new PDCCH region through signaling, that is, information on a subcarrier resource occupied in a frequency domain and/or an OFDM symbol occupied in a time domain, and the UE may perform blind detection in such a region, so as to correctly demodulate a respective PDCCH.

In the implementation of the present invention, the inventors found that resource mapping of such new PDCCH is orientation of current studies.

It should be noted that the above description of the background art is merely provided for clear and complete explanation of the present invention and for easy understanding by those skilled in the art. And it should not be understood that the above technical solution is known to those skilled in the art as it is described in the background art of the present invention.

SUMMARY OF THE INVENTION

The embodiments of the present invention is to provide a method and apparatus for resource mapping of a physical downlink control channel, so that the numbers of resources of PDCCHs of each UE are homogenized, thereby ensuring that the performance of the PDCCH is not affected by reference signals.

According to one aspect of the embodiments of the present invention, there is provided a method for resource mapping of a physical downlink control channel (PDCCH), including:

determining the number of resource sub-blocks to which a predefined number of enhanced control channel elements (eCCEs) correspond, according to the size of a resource sub-block in one resource block (RB);

determining the number of RBs onto which the predefined number of eCCEs are needed to be mapped, according to the number of resource sub-blocks to which the predefined number of eCCEs correspond; and mapping eCCEs within the PDCCH to RBs according to the number of RBs onto which the predefined number of eCCEs are needed to be mapped; wherein locations of resource sub-blocks to which the eCCEs or the predefined number of eCCEs within the PDCCH correspond are different in each of the RBs.

According to another aspect of the embodiments of the present invention, there is provided a base station, used for resource mapping of a PDCCH, wherein the base station includes:

a first determining unit configured to determine the number of resource sub-blocks to which a predefined number of eCCEs correspond, according to the size of a resource sub-block in one RB;

a second determining unit configured to determine the number of RBs onto which the predefined number of eCCEs are needed to be mapped, according to the number of resource sub-blocks to which the predefined number of eCCEs correspond; and a mapping unit configured to map eCCEs within the PDCCH to RBs, according to the number of RBs onto which the predefined number of eCCEs are needed to be mapped; wherein locations of resource sub-blocks to which the eCCEs or the predefined number of eCCEs within the PDCCH correspond are different in each of the RBs.

According to still another aspect of the embodiments of the present invention, there is provided a computer-readable program, wherein when the program is executed in a base station, the program enables a computer to carry out the method for resource mapping of a PDCCH as described above in the base station.

According to still another aspect of the embodiments of the present invention, there is provided a storage medium in which a computer-readable program is stored, wherein the computer-readable program enables a computer to carry out the method for resource mapping of a PDCCH as described above in a base station.

The advantage of the embodiments of the present invention resides in that the numbers of resources of PDCCHs of each UE are homogenized by alternatively varying mapping orders of PDCCH of each UE in each resource block, thereby ensuring that the performance of the PDCCH is not affected by reference signals.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated or reduced in size. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment. In the drawings.

DETAILED DESCRIPTION OF THE INVENTION

Foregoing and other features of the embodiments of the present invention will become apparent with reference to the drawings and the following description. These embodiments are illustrative only and are not intended to limit the present invention. For easy understanding of the principle and embodiments of the present invention by those skilled in the art, the embodiments of the present invention shall be described taking resource mapping of a PDCCH transmitted in a PDSCH region (hereinafter referred to as a PDCCH or a new PDCCH or an ePDCCH) in an LTE-A system as an example. However, it should be understood that the embodiments of the present invention are not limited to the above system, and are applicable to other systems or scenarios related to resource mapping of a PDCCH.

Currently, such new resource mapping of a PDCCH may be divided into two types. One type is continuous resource mapping, that is, multiple CCEs of a candidate of the PDCCH are mapped onto neighboring time-frequency resources. By such manner of mapping, a base station may transmit the PDCCH to UE in a time-frequency resource of better channel quality based on channel information fed back by the UE or channel information measured by a base station itself, so as to obtain a frequency selective scheduling gain. And the other type is discrete resource mapping, that is, multiple CCEs of a candidate of the PDCCH are mapped onto non-neighboring time-frequency resources. By such manner of mapping, a base station may obtain a frequency domain diversity gain even though it cannot obtain channel information, so as to ensure the performance of the PDCCH.

Figure 3:
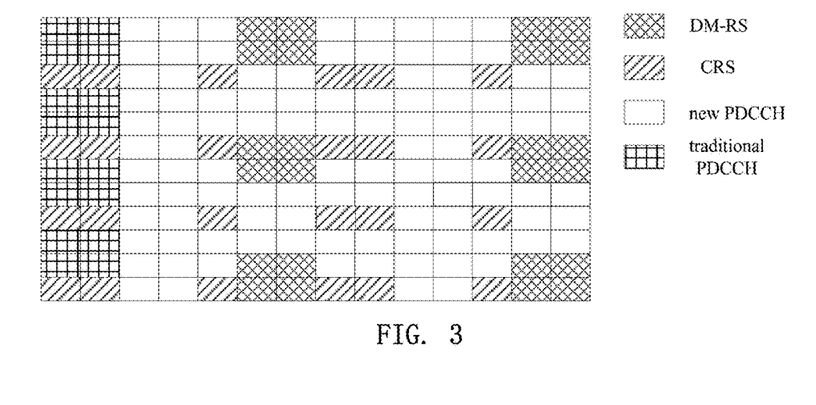
FIG. 3 is a schematic diagram of location of a reference signal of transmission region of new PDCCH.
Figure 4:
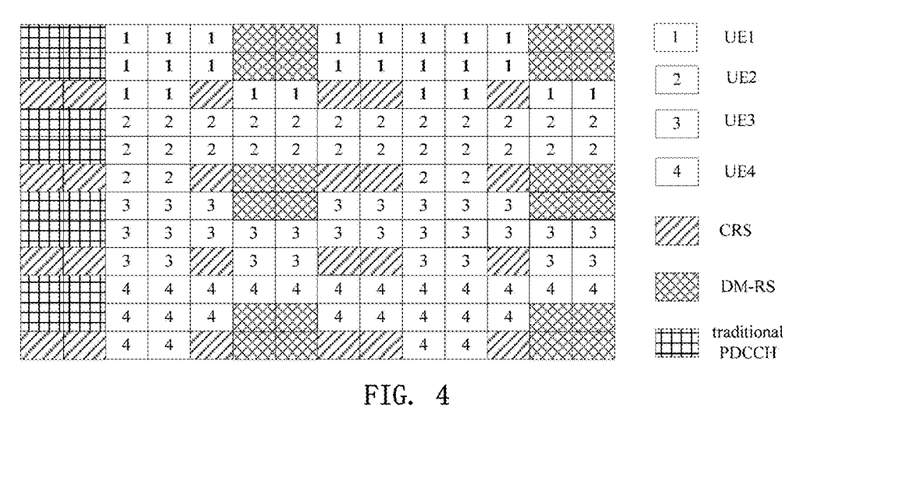
FIG. 4 is a schematic diagram of transmission locations of new PDCCHs of multiple UE.

It was found by the inventors in the implementation of the present invention that a reasonable manner is to map respectively multiple CCEs of a candidate onto different resource blocks (RBs). However, in order to improve spectrum efficiency, PDCCHs of multiple UE need to be mapped onto different subcarriers of the same RB, that is, PDCCHs of multiple UE is multiplexed in an FDM (frequency-division multiplexing) manner, PDCCH of each UE occupying M subcarriers, referred to as enhanced control channel elements (eCCEs), as shown in FIGS. 3 and 4. Wherein, FIG. 3 is a schematic diagram of possible locations of resources of new PDCCH on one RB, and FIG. 4 is a schematic diagram of possible locations of resources of new PDCCHs of multiple UE on one RB.

However, in a region of new PDCCH, there exist various reference signals, such as a cell-specific reference signal (CRS) and a demodulation reference signal (DM-RS), as shown in FIG. 3. Therefore, in mapping new PDCCH, locations of reference signals need to be reserved, thereby resulting in variation of PDCCH resources along with variation of overhead of the reference signals. As shown in FIG. 4, in a PDCCH region of UE4, 12 REs are occupied by reference signals, while in a PDCCH region of UE2, 8 REs are occupied by reference signals, which results in that the numbers of resources occupied by the PDCCHs of the two UE are different, thereby making performances varied along and affecting their robustness. This is a problem needing to be solved urgently.

Embodiments of the present invention provide a method and apparatus for resource mapping of a physical downlink control channel, in which the numbers of resources of new PDCCHs of each UE are homogenized by alternatively varying mapping orders of new PDCCH of each UE in each resource block (RB), thereby ensuring that the performance of new PDCCH is not affected by the reference signals.

The present invention shall be described below by way of embodiments.

Embodiment 1

Figure 5:
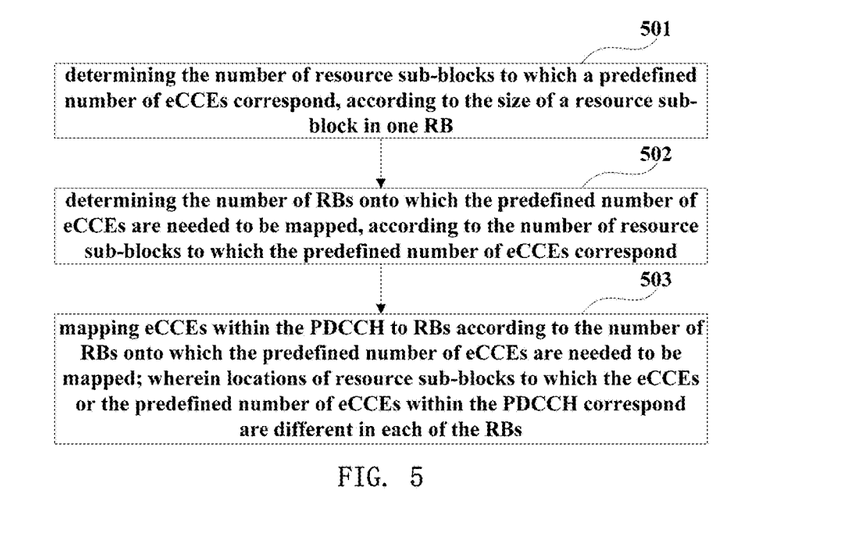
FIG. 5 is a flowchart of a method for resource mapping of a physical downlink control channel of an embodiment of the present invention.

An embodiment of the present invention provides a method for resource mapping of a physical downlink control channel. FIG. 5 is a flowchart of the method. As shown in FIG. 5, the method includes:

step 501: determining the number of resource sub-blocks to which a predefined number of enhanced control channel elements (eCCEs) correspond, according to the size of a resource sub-block in one resource block (RB);

wherein, each RB is divided into multiple smaller resource sub-blocks as needed; for example, if PDCCHs of 4 UE multiplex one RB, the RB may be divided into 4 smaller resource sub-blocks; and dividing policy and dividing manner are not limited in this embodiment;

wherein, as one CCE corresponds to 36 REs, the number of resource sub-blocks to which an eCCE corresponds may be determined according to the size of each resource sub-block; and wherein, when the number of resource sub-blocks to which one eCCE corresponds is not an integer, the corresponding relationship between them may be determined on a basis that multiple eCCEs correspond to an integral number of resource sub-blocks; for example, if one eCCE corresponds to 1.5 resource sub-blocks, it is determined that 2 eCCEs correspond to 3 resource sub-blocks;

step 502: determining the number of RBs onto which the predefined number of eCCEs are needed to be mapped, according to the number of resource sub-blocks to which the predefined number of eCCEs correspond;

wherein, in a preferred embodiment, the number of resource sub-blocks to which the predefined number of eCCEs correspond is identical to the number of RBs onto which the predefined number of eCCEs are needed to be mapped; for example, if one eCCE corresponds to 2 resource sub-blocks, the eCCE needs to be mapped onto 2 RBs, that is, 2 resource sub-blocks to which one eCCE corresponds are respectively in 2 RBs; and in other embodiments, the number of RBs onto which the predefined number of eCCEs are needed to be mapped may be determined according to resource configuration; for example, if one eCCE corresponds to 3 resource sub-blocks, the eCCE may also be mapped onto 2 RBs according to resource configuration, that is, 3 resource sub-blocks to which one eCCE corresponds are in 2 RBs;

step 503: mapping eCCEs within the PDCCH to RBs according to the number of RBs onto which the predefined number of eCCEs are needed to be mapped; wherein locations of resource sub-blocks to which the eCCEs or the predefined number of eCCEs within the PDCCH correspond are different in each of the RBs;

wherein, as aggregation level of a PDCCH correspond to CCE/eCCE one by one, the number of eCCEs within the PDCCH may be determined according to the aggregation level; for example, if an aggregation level L=1, it is determined that one PDCCH contains one eCCE; if an aggregation level L=2, it is determined that one PDCCH contains 2 eCCEs; if an aggregation level L=4, it is determined that one PDCCH contains 4 eCCEs; and if an aggregation level L=8, it is determined that one PDCCH contains 8 eCCEs; hence, one or more eCCEs within a PDCCH may be mapped onto a corresponding number of RBs according to the number of RBs onto which the predefined number of eCCEs are needed to be mapped; for example, one eCCE corresponds to 2 resource sub-blocks and needs to be mapped onto 2 RBs, and if an aggregation level L=1, that is, one PDCCH contains one eCCE, the two resource sub-blocks to which the eCCE of the PDCCH corresponds are mapped onto 2 RBs, each RB having one resource sub-block corresponding to the eCCE; if an aggregation level L=2, one PDCCH contains two eCCEs, the four resource sub-blocks to which the two eCCEs within the PDCCH correspond are mapped onto 4 RBs, each RB having one resource sub-block corresponding to the eCCE; and so on, which shall not be described any further.

Wherein, according to this embodiment, the locations of the resource sub-blocks to which the eCCEs or the predefined number of eCCEs within the PDCCH correspond are different in each of the RBs. Taking still that one eCCE corresponds to 2 resource sub-blocks and needs to be mapped onto two RBs as an example, according to the method of this embodiment, the location of a first resource sub-block to which the eCCE corresponds on a first RB is different from the location of a second resource sub-block to which the eCCE corresponds on a second RB, thereby making the numbers of resources occupied by each PDCCH equal or approximately equal.

Wherein, in an embodiment, the locations of the resource sub-blocks to which the eCCEs or the predefined number of eCCEs within the PDCCH correspond are periodically cyclically shifted in each of the RBs. And in another embodiment, the locations of the resource sub-blocks to which the eCCEs or the predefined number of eCCEs within the PDCCH correspond are predefined in each of the RBs.

In the above embodiment, a cyclic manner of the periodically cyclically shifting or the predefined location may be determined according to the size of the eCCE or overhead of reference signals in the RB or the size of an aggregation level; wherein, the size of the eCCE is that how many resource sub-blocks to which one eCCE corresponds; and the size of the aggregation level decides how many eCCEs is contained in one PDCCH, hence deciding how many RBs onto which one PDCCH is needed to be mapped. Following description is given by way of embodiments.

In the above embodiment, the cyclic manner of the periodically cyclically shifting or the predefined location may be determined according to a predefined policy, that is, they do not vary along with the size of the eCCE or the size of the aggregation level. For example, the cyclic manner of the periodically cyclically shifting or the predefined location is set to be fixed, only if it is ensured that the numbers of resources occupied by each PDCCH are equal or approximately equal according to different locations of the resource sub-blocks to which the eCCEs within the PDCCH correspond on each of the RBs.

According to a mode of implementation of this embodiment, the locations of the resource sub-blocks to which the predefined number of eCCEs within the PDCCH correspond on each of the RBs are periodically cyclically shifted. For example, one eCCE corresponds to 2 resource sub-blocks and needs to be mapped onto two RBs, and if the location of the first resource sub-block to which the eCCE corresponds on the first RB is a (2i−1)-th resource sub-block, the location of the second resource sub-block to which the eCCE corresponds on the second RB is a 2i-th resource sub-block; where, i is a natural number greater than 0; that is, the location of the first resource sub-block to which the eCCE corresponds on the first RB and the location of the second resource sub-block to which the eCCE corresponds on the second RB are interchangeable. Wherein, for a case where the number of eCCEs within the PDCCH is greater than the above predefined number, the above method for mapping is repeated taking the number of RBs to which the above predefined number corresponds as a cycle. For example, if an aggregation level L=2, one PDCCH contains two eCCEs, corresponding to four resource sub-blocks, and are mapped onto 4 RBs, and the above method for mapping is repeated taking 2 RBs as a cycle. At this moment, in the 4 resource sub-block to which the PDCCH corresponds, the former two are interchangeable on the former two RBs, and the latter two are interchangeable on the latter two RBs.

According to another mode of implementation of this embodiment, the locations of the resource sub-blocks to which the eCCEs within the PDCCH correspond on each of the RBs are periodically cyclically shifted. For example, one eCCE corresponds to 2 resource sub-blocks, if an aggregation level L=2, one PDCCH contains 2 eCCEs, 4 resource sub-blocks to which the 2 eCCEs within the PDCCH correspond are mapped onto 4 RBs, and if the location of the first resource sub-block to which the eCCEs correspond on the first RB is a (4i−3)-th resource sub-block, the location of the second resource sub-block to which the eCCEs correspond on the second RB is a (4i−2)-th resource sub-block, the location of the third resource sub-block to which the eCCEs correspond on the third RB is a (4i−1)-th resource sub-block, and the location of the fourth resource sub-block to which the eCCEs correspond on the fourth RB is a 4i-th resource sub-block; where, i is a natural number greater than 0; that is, the locations of the resource sub-blocks to which the eCCEs correspond on each of the RBs are rotatably shifted in turn.

According to still another mode of implementation of this embodiment, the locations of the resource sub-blocks to which the predefined number of eCCEs within the PDCCH correspond on each of the RBs are predefined. For example, one eCCE corresponds to 3 resource sub-blocks and needs to be mapped onto 3 RBs, and the location of each resource sub-block to which the eCCE corresponds on the RB may be predefined to be fixed. Likewise, for a case where the number of eCCEs within the PDCCH is greater than the above predefined number, the above method for mapping may be repeated taking the number of RBs to which the above predefined number corresponds as a cycle; and the location of each resource sub-block on the RBs may also be predefined.

In the above three modes of implementation, the number of resources occupied by each PDCCH is equal or approximately equal, no matter the locations of the resource sub-blocks to which the eCCEs within the PDCCH correspond on each of the RBs are periodically cyclically shifted or predefined; that is, the numbers of REs occupied by PDCCH of each UE are approximately equal, thereby ensuring that the performance of the PDCCH is not affected by the reference signals.

For more clear and easy to be understood, the method for resource mapping of a physical downlink control channel of this embodiment shall be described below by way of examples.

Figure 6:
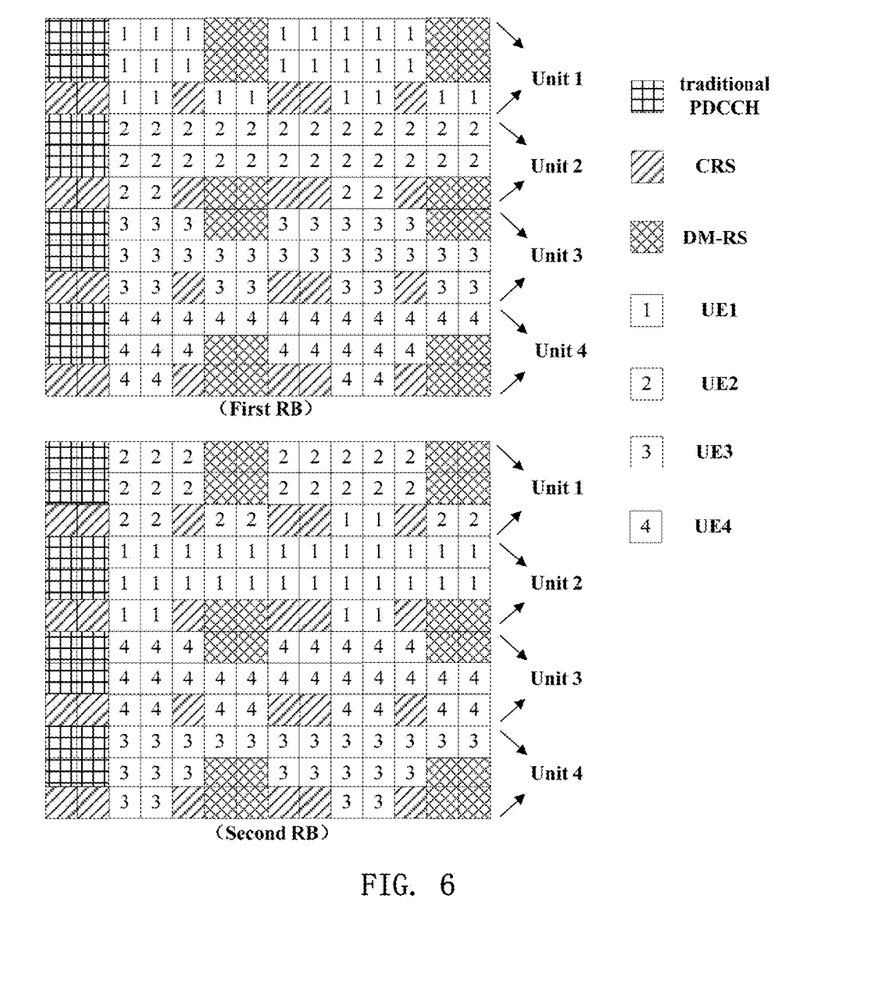
FIG. 6 is a schematic diagram of resource mapping of an embodiment of the present invention.

FIG. 6 is a schematic diagram of resource mapping of a PDCCH of an embodiment of the present invention.

Referring to FIG. 6, in this embodiment, taking one RB being multiplexed by 4 UE as an example. One RB is divided into 4 smaller resource sub-blocks, numbered as units 1-4, each unit containing 3 subcarriers. According to the method of this embodiment, it is determined that one eCCE needs to correspond to 2 units according to the size of the unit, and the 2 units are respectively mapped onto 2 RBs. In this embodiment, for the reference signal, it is assumed that the DM-RS may support rank=4, and the CRS may support 2 antennas.

According to the method of this embodiment, if the aggregation level L=1, as the PDCCH of each UE contains one eCCE, mapping relationship between eCCEs of the 4 UE and time-frequency resources is: if UE j is mapped onto a (2i−1)-th unit of the first RB, the UE j is mapped onto a 2i-th unit of the second RB. That is, 2 RBs are taken as a cycle, and the (2i−1)-th unit and the 2i-th unit are interchanged; where, i is a natural number greater than 0.

According to the method of this embodiment, if the aggregation level L>1, such as L=2 or 4 or 8, and the number of RBs to which one PDCCH corresponds is greater than 2, the above alternative manner may be repeated; that is, 2 RBs are taken as a cycle, and alternative mapping is performed within the 2 RBs.

In the embodiment shown in FIG. 6, description is given taking that PDCCHs of UE1 and UE2 are interchanged in unit1 and unit2 of different RBs and PDCCHs of UE3 and UE4 are interchanged in unit3 and unit4 of different RBs as an example. However, this embodiment is not limited thereto, and only if the numbers of the resources occupied by the PDCCH of each UE are approximately equal, no matter how to map. For example, it may also be that the PDCCH of UE1 occupies unit1 of the first RB and unit4 of the second RB, the PDCCH of UE2 occupies unit2 of the first RB and unit3 of the second RB, the PDCCH of UE3 occupies unit3 of the first RB and unit2 of the second RB, and the PDCCH of UE4 occupies unit4 of the first RB and unit1 of the second RB.

In the method for resource mapping of a PDCCH shown in FIG. 6, the PDCCH of UE1 occupies unit1 of the first RB and unit2 of the second RB, the number of resources allocated to it is 24+28=52; the PDCCH of UE2 occupies unit2 of the first RB and unit1 of the second RB, the number of resources allocated to it is 28+24=52; the PDCCH of UE3 occupies unit3 of the first RB and unit4 of the second RB, the number of resources allocated to it is 28+24=52; and the PDCCH of UE4 occupies unit4 of the first RB and unit3 of the second RB, the number of resources allocated to it is 24+28=52. It can be seen that the numbers of resources allocated to the PDCCHs of each UE are equal, thereby ensuring that the performance of the PDCCH is not affected by the reference signals.

Figure 7:
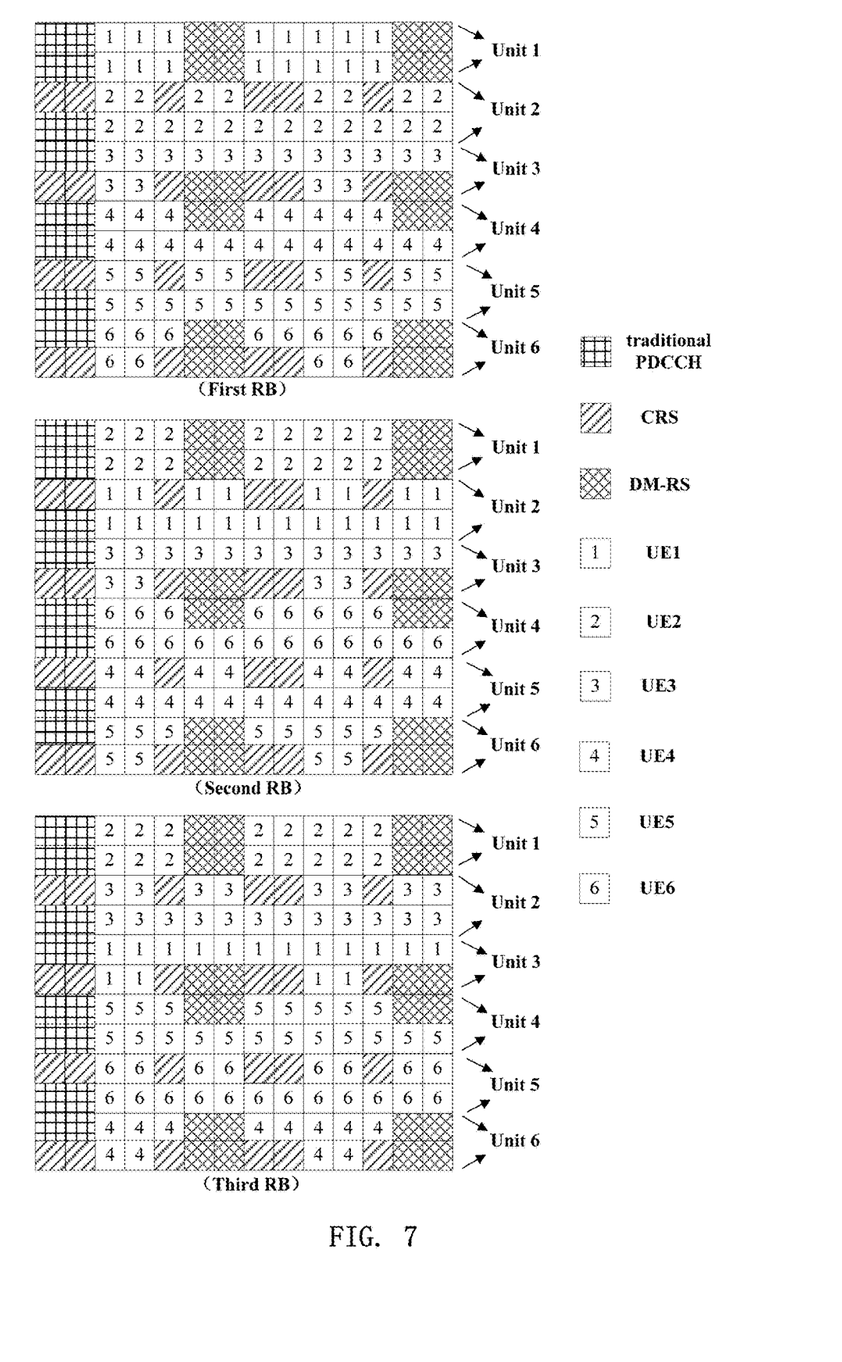
FIG. 7 is a schematic diagram of resource mapping of another embodiment of the present invention.

FIG. 7 is a schematic diagram of resource mapping of a PDCCH of another embodiment of the present invention.

Referring to FIG. 7, in this embodiment, taking one RB being multiplexed by 6 UE as an example. One RB is divided into 6 smaller resource sub-blocks, numbered as units 1-6, each unit containing 2 subcarriers. According to the method of this embodiment, it is determined that one eCCE needs to correspond to 3 units according to the size of the unit, and the 3 units are respectively mapped onto 3 RBs. In this embodiment, for the reference signal, it is assumed that the DM-RS may support rank=4, and the CRS may support 2 antennas.

According to the method of this embodiment, if the aggregation level L=1, as the PDCCH of each UE contains one eCCE, mapping relationship between eCCEs of the 6 UE and time-frequency resources is: the PDCCH of UE1 occupies unit1 of the first RB, unit2 of the second RB and unit3 of the third RB; the PDCCH of UE2 occupies unit2 of the first RB, unit1 of the second RB and unit1 of the third RB; the PDCCH of UE3 occupies unit3 of the first RB, unit3 of the second RB and unit2 of the third RB; the PDCCH of UE4 occupies unit4 of the first RB, unit5 of the second RB and unit6 of the third RB; the PDCCH of UE5 occupies unit5 of the first RB, unit6 of the second RB and unit4 of the third RB; and the PDCCH of UE6 occupies unit6 of the first RB, unit4 of the second RB and unit5 of the third RB. It can be seen that all the numbers of the resources occupied by the PDCCH of each UE are all 52.

According to the method of this embodiment, if the aggregation level L>1, such as L=2 or 4 or 8, and the number of RBs to which one PDCCH corresponds is greater than 3, the above alternative manner may be repeated; that is, 3 RBs are taken as a cycle, and alternative mapping is performed within the 3 RBs.

Similar to the embodiment shown in FIG. 6, the cyclic manner or the mapping pattern is not limited in this embodiment, only if it is ensured that the numbers of the resources occupied by the PDCCH of each UE are equal or approximately equal. For example, if 3 units to which one eCCE corresponds are respectively mapped onto 2 RBs, the numbers of the resources occupied by the PDCCH of each UE being completely consistent may not be achieved. However, as such a dynamic manner of resource mapping is employed, the performance of the PDCCHs is greatly improved compared to that the PDCCH of each UE is fixed at a certain location of an RB.

In the method for resource mapping of a PDCCH shown in FIG. 7, the numbers of resources allocated to the PDCCHs of each UE are equal, thereby ensuring that the performance of the PDCCH is not affected by the reference signals.

Figure 8:
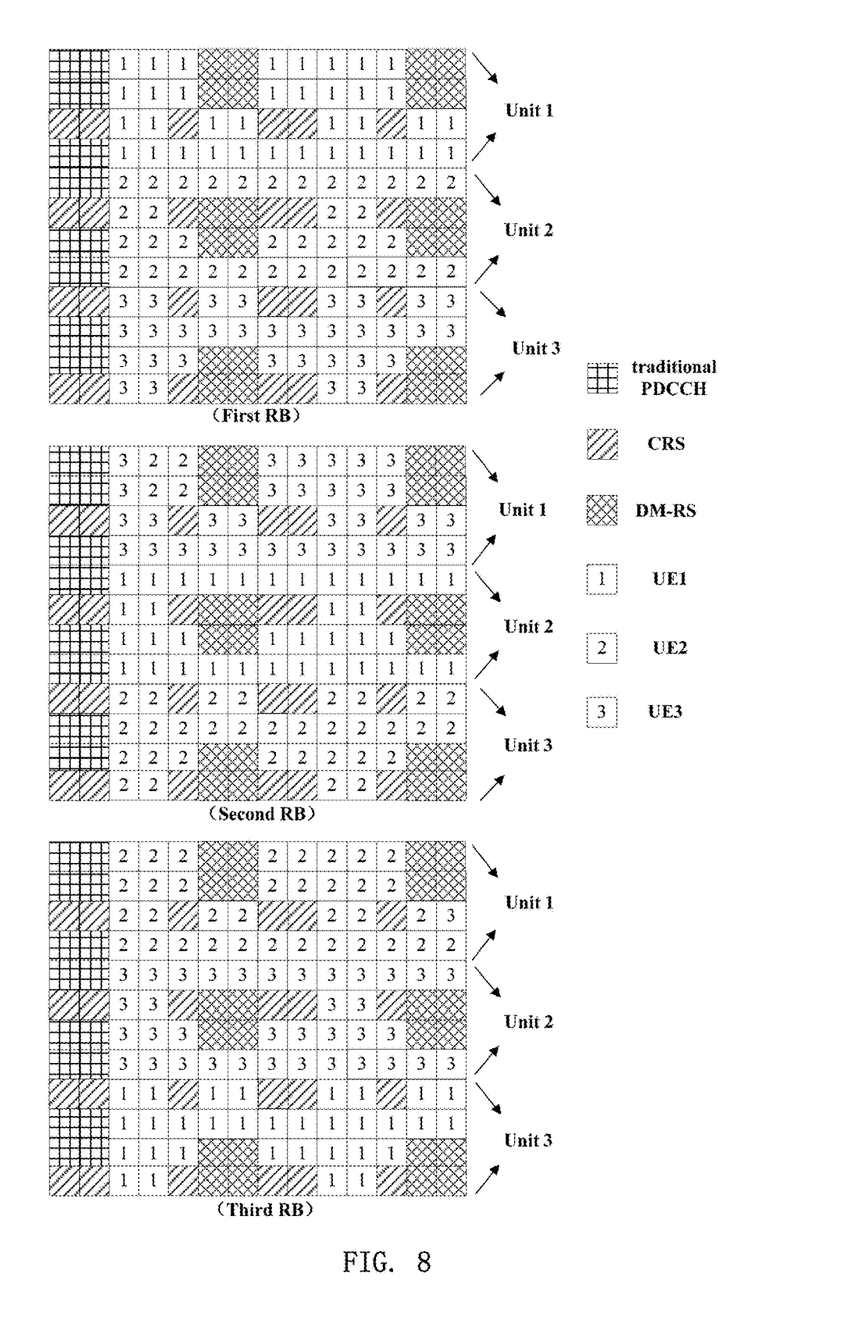
FIG. 8 is a schematic diagram of resource mapping of still another embodiment of the present invention.

FIG. 8 is a schematic diagram of resource mapping of a PDCCH of still another embodiment of the present invention.

Referring to FIG. 8, in this embodiment, taking one RB being multiplexed by 3 UE as an example. One RB is divided into 3 smaller resource sub-blocks, numbered as units 1-3, each unit containing 4 subcarriers. According to the method of this embodiment, it is determined that one eCCE needs to correspond to 1.5 units according to the size of the unit, such that two eCCEs correspond to 3 units, which are respectively mapped onto 3 RBs. In this embodiment, for the reference signal, it is assumed that the DM-RS may support rank=4, and the CRS may support 2 antennas.

According to the method of this embodiment, if the aggregation level L=2, as the PDCCH of each UE contains two eCCEs, mapping relationship between eCCEs of 3 UE and time-frequency resources is: if the PDCCH is mapped to an i-th unit of the first RB, it is mapped to a mod(i+1, 3)-th unit of the second RB, and is mapped to a mod(i+2, 3)-th unit of the third RB, i being a natural number greater than 0.

As shown in FIG. 8, the PDCCH of UE1 occupies unit1 of the first RB, unit2 of the second RB and unit3 of the third RB; the PDCCH of UE2 occupies unit2 of the first RB, unit3 of the second RB and unit1 of the third RB; and the PDCCH of UE3 occupies unit3 of the first RB, unit1 of the second RB and unit2 of the third RB. It can be seen that all the numbers of the resources occupied by the PDCCH of each UE are all 100.

According to the method of this embodiment, if the aggregation level L>2, such as L=4 or 8, and the number of RBs to which one PDCCH corresponds is greater than 3, the above alternative manner may be repeated; that is, 3 RBs are taken as a cycle, and alternative mapping is performed within the 3 RBs.

Similar to the embodiments shown in FIGS. 6 and 7, the cyclic manner or the mapping pattern is not limited in this embodiment, only if it is ensured that the numbers of the resources occupied by the PDCCH of each UE are equal or approximately equal.

In method for resource mapping of a PDCCH shown in FIG. 8, the numbers of resources allocated to the PDCCHs of each UE are equal, thereby ensuring that the performance of the PDCCH is not affected by the reference signals.

Figure 9:
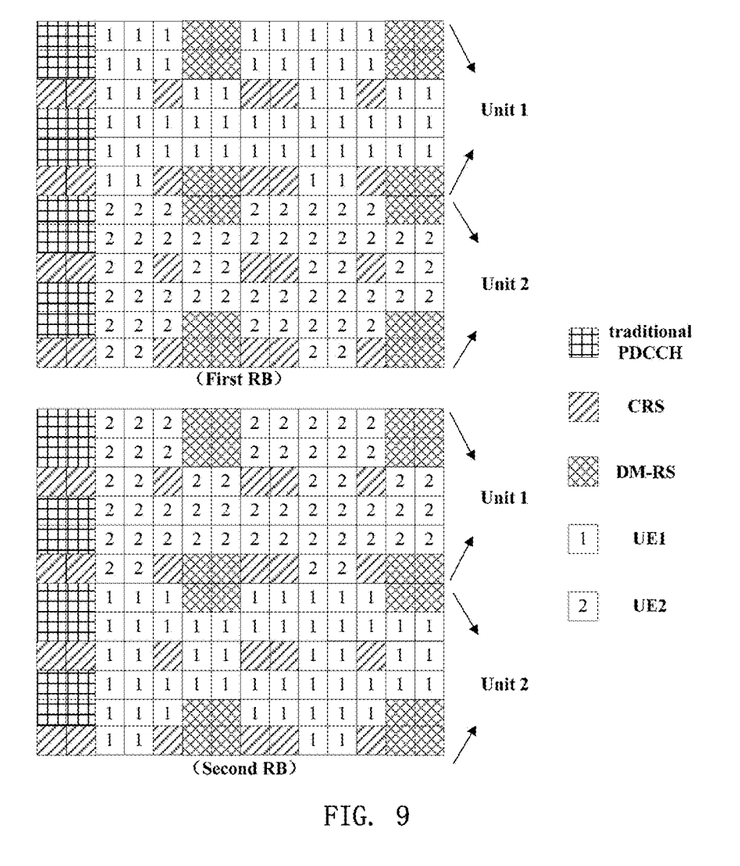
FIG. 9 is a schematic diagram of resource mapping of further still another embodiment of the present invention.

FIG. 9 is a schematic diagram of resource mapping of a PDCCH of further still another embodiment of the present invention.

Referring to FIG. 9, in this embodiment, taking one RB being multiplexed by 2 UE as an example. One RB is divided into 2 smaller resource sub-blocks, numbered as units 1-2, each unit containing 6 subcarriers. According to the method of this embodiment, it is determined that one eCCE needs to correspond to 1 unit according to the size of the unit. As resources need to be mapped to different RBs, two eCCEs corresponding to 2 units and being respectively mapped to 2 RBs may be taken as an example. In this embodiment, for the reference signal, it is assumed that the DM-RS may support rank=2, and the CRS may support 2 antennas.

According to the method of this embodiment, if the aggregation level L=2, as the PDCCH of each UE contains two eCCEs, mapping relationship between eCCEs of the 2 UE and time-frequency resources is: if the PDCCH is mapped to an i-th unit of the first RB, it is mapped to a mod(i+1, 2)-th unit of the second RB, i being a natural number greater than 0.

As shown in FIG. 9, the PDCCH of UE1 occupies unit1 of the first RB and unit2 of the second RB; and the PDCCH of UE2 occupies unit2 of the first RB and unit1 of the second RB. It can be seen that all the numbers of the resources occupied by the PDCCH of each UE are all 100.

According to the method of this embodiment, if the aggregation level L>2, such as L=4 or 8, and the number of RBs to which one PDCCH corresponds is greater than 2, the above alternative manner may be repeated; that is, 2 RBs are taken as a cycle, and alternative mapping is performed within the 2 RBs.

Similar to the embodiments shown in FIGS. 6, 7 and 8, the cyclic manner or the mapping pattern is not limited in this embodiment, only if it is ensured that the numbers of the resources occupied by the PDCCH of each UE are equal or approximately equal.

In the method for resource mapping of a PDCCH shown in FIG. 9, the numbers of resources allocated to the PDCCHs of each UE are equal, thereby ensuring that the performance of the PDCCH is not affected by the reference signals.

An embodiment of the present invention further provides a base station, as described in Embodiment 2 below. As the principle of the base station for solving problem is similar to that of the method for resource mapping of a physical downlink control channel in Embodiment 1, the implementation of the method may be referred to for the implementation of the base station, and the repeated parts shall not be described any further.

Embodiment 2

Figure 10:
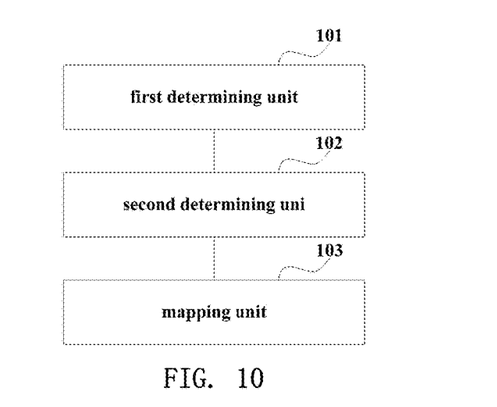
FIG. 10 is a schematic diagram of the structure of a base station of an embodiment of the present invention.

An embodiment of the present invention further provides a base station, used for resource mapping of a PDCCH. FIG. 10 is a schematic diagram of the structure of the base station. Referring to FIG. 10, the base station includes:

a first determining unit 101 configured to determine the number of resource sub-blocks to which a predefined number of eCCEs correspond, according to the size of a resource sub-block in one RB;

a second determining unit 102 configured to determine the number of RBs onto which the predefined number of eCCEs are needed to be mapped, according to the number of resource sub-blocks to which the predefined number of eCCEs correspond; and a mapping unit 103 configured to map eCCEs within the PDCCH to RBs according to the number of RBs onto which the predefined number of eCCEs are needed to be mapped; wherein locations of resource sub-blocks to which the eCCEs or the predefined number of eCCEs within the PDCCH correspond are different in each of the RBs.

In an embodiment, the locations of the resource sub-blocks to which the eCCEs or the predefined number of eCCEs within the PDCCH correspond are periodically cyclically shifted in each of the RBs.

In another embodiment, the locations of the resource sub-blocks to which the eCCEs or the predefined number of eCCEs within the PDCCH correspond are predefined in each of the RBs.

In the above two embodiments, the mapping unit 103 is further configured to determine a cyclic manner of the periodically cyclically shifting or the predefined locations according to the size of the eCCE or overhead of reference signals in the RBs or the size of an aggregation level, so that the numbers of resources occupied by each PDCCH are equal or approximately equal.

In the above two embodiments, the mapping unit 103 is further configured to determine a cyclic manner of the periodically cyclically shifting or the predefined locations according to a predefined policy, so that the numbers of resources occupied by each PDCCH are equal or approximately equal.

In the base station of this embodiment, as the numbers of resources occupied by each PDCCH are equal or approximately equal, the performance of the PDCCH is optimized, thereby ensuring that the performance of the PDCCH is not affected by the reference signals.

An embodiment of the present invention further provides a computer-readable program, wherein when the program is executed in a base station, the program enables a computer to carry out the method for resource mapping of a PDCCH as described in Embodiment 1 in the base station.

An embodiment of the present invention further provides a storage medium in which a computer-readable program is stored, wherein the computer-readable program enables a computer to carry out the method for resource mapping of a PDCCH as described in Embodiment 1 in a base station.

The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

What is claimed is:

1. A method for resource mapping of a physical downlink control channel (PDCCH), comprising:
   determining a number of resource sub-blocks to which a predefined number of enhanced control channel elements (eCCEs) correspond, according to the size of a resource sub-block in one resource block (RB) and a number of resource elements (REs) for one eCCE wherein the PDCCHs of multiple UEs are mapped onto different subcarriers of the same RB;
   determining a number of RBs onto which the predefined number of eCCEs are needed to be mapped, according to the number of resource sub-blocks to which the predefined number of eCCEs correspond; and
   mapping eCCEs within the PDCCH to RBs according to the number of RBs onto which the predefined number of eCCEs are needed to be mapped; wherein
   locations of the resource sub-blocks to which the eCCEs or the predefined number of eCCEs within the PDCCH correspond are periodically cyclically shifted in each of the RBs, so that locations of resource sub-blocks to which the eCCEs or the predefined number of eCCEs within the PDCCH correspond are different in each of the RBs.

2. The method according to claim 1, wherein,
   a cyclic manner of the periodically cyclically shifting is determined according to the size of the eCCE or overhead of reference signals in the RB or the size of an aggregation level.

3. A base station, used for resource mapping of a PDCCH, wherein the base station comprises:
   a first determining unit configured to determine a number of resource sub-blocks to which a predefined number of eCCEs correspond, according to the size of a resource sub-block in one RB and a number of REs for one eCCE wherein the PDCCHs of multiple UEs are mapped onto different subcarriers of the same RB;
   a second determining unit configured to determine a number of RBs onto which the predefined number of eCCEs are needed to be mapped, according to the number of resource sub-blocks to which the predefined number of eCCEs correspond; and a mapping unit configured to map eCCEs within the PDCCH to RBs, according to the number of RBs onto which the predefined number of eCCEs are needed to be mapped; wherein, locations of the resource sub-blocks to which the eCCEs or the predefined number of eCCEs within the PDCCH correspond are periodically cyclically shifted in each of the RBs, so that locations of resource sub-blocks to which the eCCEs or the predefined number of eCCEs within the PDCCH correspond are different in each of the RBs.

4. The base station according to claim 3, wherein, the mapping unit is further configured to determine a cyclic manner of the periodically cyclically shifting according to the size of the eCCE or overhead of reference signals in the RBs or the size of an aggregation level.

\* \* \* \* \*